May 27, 1941.   W. J. MORRISSEY   2,243,112
APPARATUS FOR SYNCHRONIZING PICTURES WITH SOUND
Filed Dec. 31, 1938   2 Sheets—Sheet 1
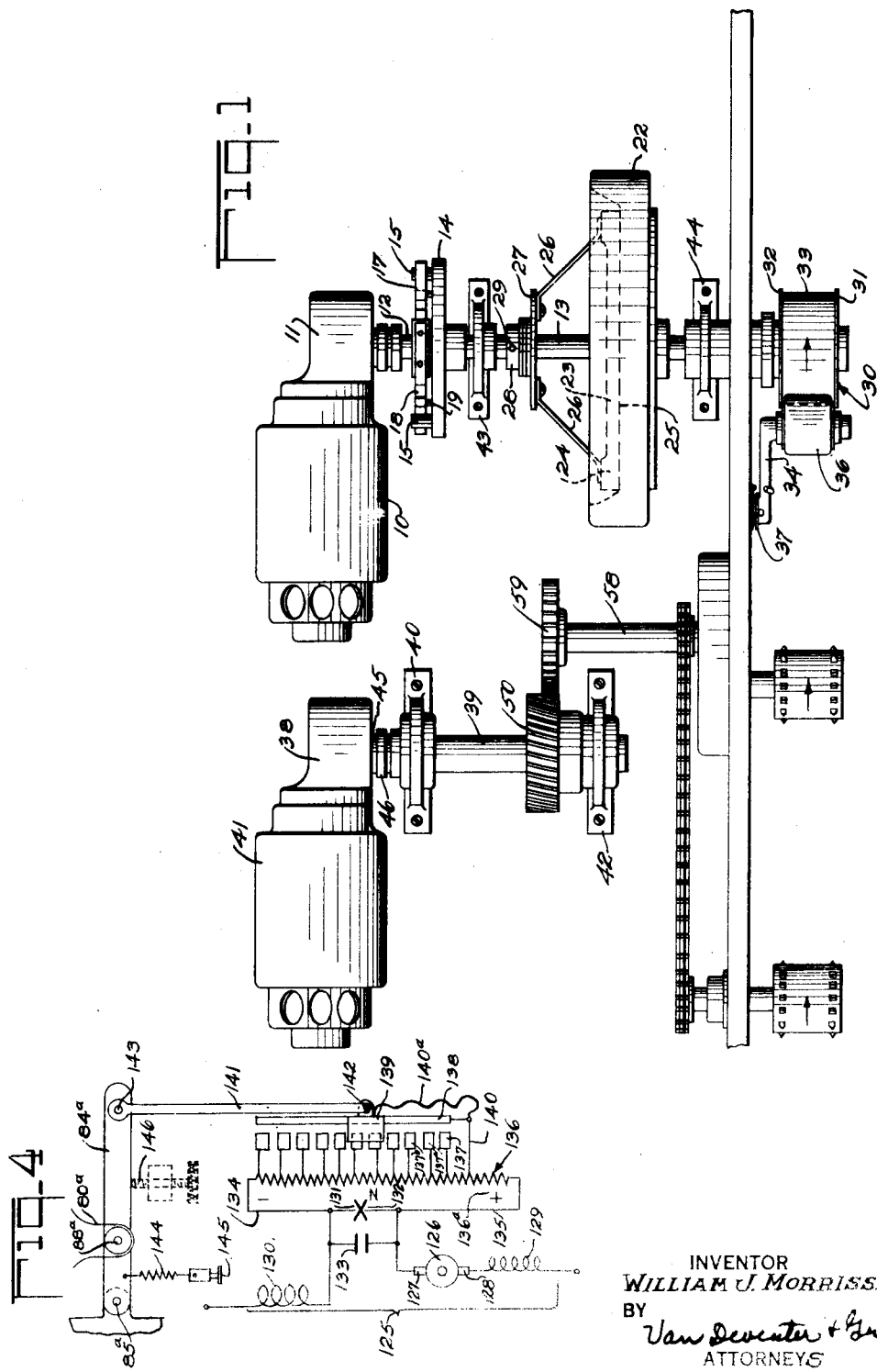
INVENTOR
WILLIAM J. MORRISSEY
BY
Van Deventer + Grier
ATTORNEYS May 27, 1941.  W. J. MORRISSEY  2,243,112
APPARATUS FOR SYNCHRONIZING PICTURES WITH SOUND
Filed Dec. 31, 1938    2 Sheets-Sheet 2
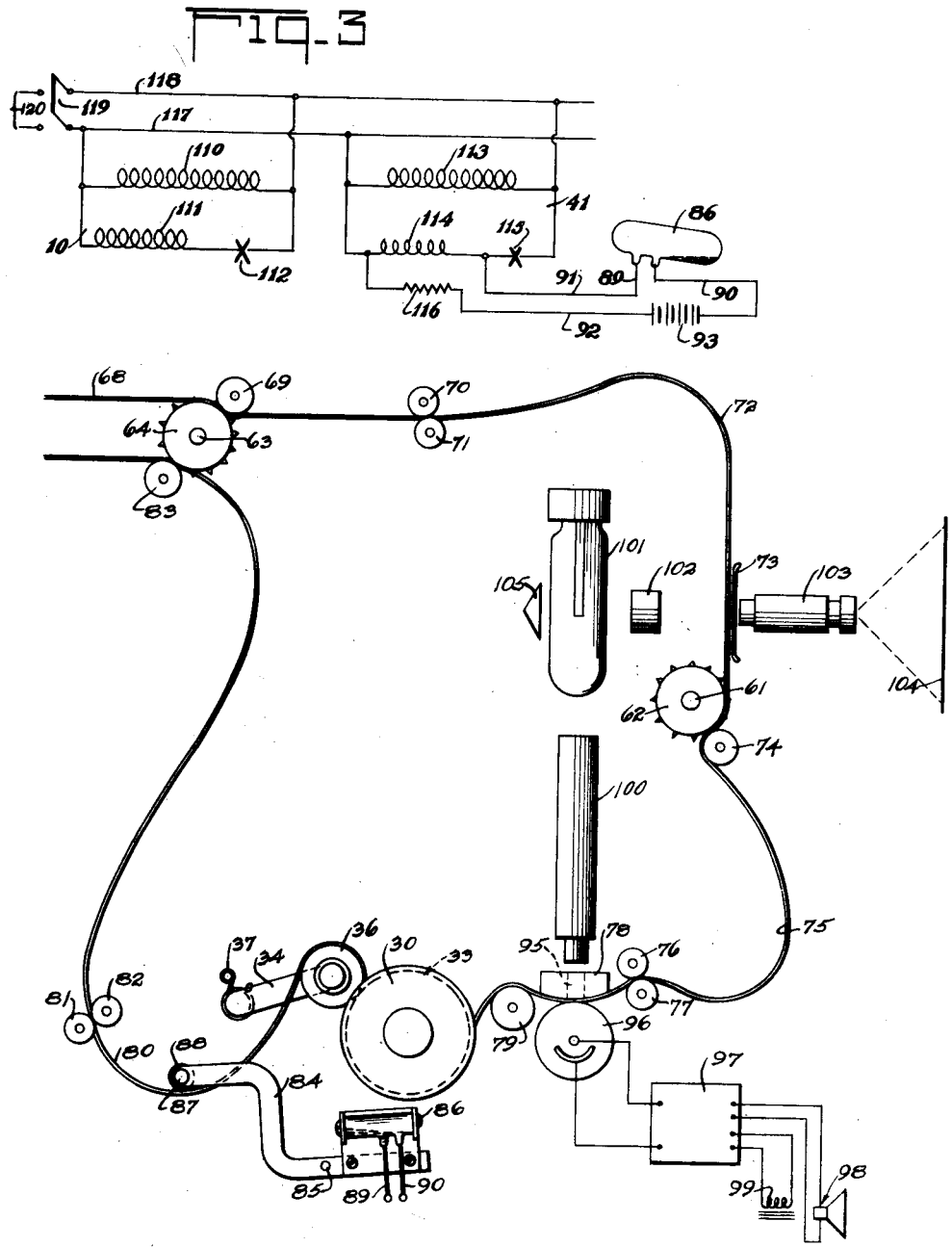
INVENTOR
WILLIAM J. MORRISSEY.
BY
ATTORNEYS Patented May 27, 1941

2,243,112

UNITED STATES PATENT OFFICE 2,243,112

APPARATUS FOR SYNCHRONIZING PICTURES WITH SOUND

William J. Morrissey, New York, N. Y.

Application December 31, 1938, Serial No. 248,828

6 Claims. (Cl. 271—2.3)

This invention relates to improvements in apparatus for synchronizing pictures with sound, and has for a principal object the provision of a device for projecting pictures and producing sound, in which the record in the sound reproducing portion of the machine is driven at a constant speed on a drum, or the like, having a smooth surface, and in which the film through the picture projecting portion of the machine, and to and from the drum, is carried on sprockets or otherwise positively driven, said device being adapted to bring a picture into synchronism with the sound to correct for slippage of the record on the drum.

This application is a continuation in part of application Serial No. 49,447 filed November 13, 1935, now Patent No. 2,142,141 dated January 3, 1939.

In sound reproducing devices in which the film is carried on a smooth drum, slippage occurs due to the fact that no teeth are driving the film and the purpose of the present invention is to drive the film through the sound portion of the machine at as nearly a constant speed as can possibly be obtained, and to make corrections for the slippage of the film by momentarily slowing down the speed of all of the sprockets carrying the film through the machine. This will momentarily change the speed of the pictures but due to the persistence of vision a person viewing the picture cannot detect this change.

The speed of the film through the picture portion of the projector can be changed as follows:

1. The provision of a clutch between the driving motor and all sprockets in the machine makes it possible to momentarily disengage the latter from the driving motor.

2. The provision of a motor drive for the sound portion of the machine, and a separate motor drive for the sprockets and the intermittent movement in the machine, make it possible to slow down the latter drive by either (a) momentarily interrupting the current supply to the latter motor; (b) by phase displacement; e. g., throwing out of synchronism by D. C. on starter windings, etc.; or (c) by the momentary cessation of, or the speeding up of, the action of said last motor.

Another object of the invention is the provision in a sound projector of means varying the number of pictures projected per second to compensate for the slippage of the film through a sound reproducer in said projector without detection by an audience due to the persistence of vision of said audience.

A further object of the invention is the provision in a projector of a film positively driven at a plurality of points and frictionally driven at at least one other point by means independent of the means positively driving said film, and the provision of means for compensating said positive drive to correct for slippage in said frictional drive.

A further object of the invention is the provision in a projector of feed and take-up sprockets and an intermittent movement all adapted to positively move a film therethrough; the provision of a synchronous motor for driving said sprockets; the provision of a frictional drive engaging the film between the intermittent movement and one of said sprockets, loops being provided in the film on either side of said frictional drive, a second synchronous motor being provided for motivating said frictional drive; and the provision of means engaging the film in the vicinity of one of said loops and adapted to momentarily dephase said first synchronous motor and thereby bring the picture carried on said sprockets into synchronism with sound reproduced from the film under the influence of the frictional drive.

Another object of the invention is the provision in a projector of a motor driving sprockets in said projector carrying the pictures and a second motor driving a frictional drum for moving said film through the sound gate of said projector, loops being formed in said film on each side of said sound gate and switching means operable by the shortening of one of said loops for momentarily disconnecting said first motor from the source of current supply in order to compensate for the slippage of film through said sound gate.

A still further object of the invention is the provision in a projector of a synchronous motor driving sprockets in said projector carrying pictures, said motor being provided with dephasing means, and a second synchronous motor driving a frictional drum for moving said film through the sound gate of said projector, loops being formed in said film on each side of said sound gate and switching means operable by the shortening of one of said loops for momentarily energizing said dephasing means in order to compensate for the slippage of film through said sound gate.

Other objects will be apparent to those skilled in the art.

Referring to the drawings:

Figure 1 is a diagrammatic representation of a smooth drum for moving film through a sound reproducer, said drum being driven by a synchronous motor, and sprocket drives for feeding and projecting the film and delivering it to and from the sprocket drives, said sprocket drives being driven by a second synchronous motor which is provided with a dephasing coil;

Figure 2 is a diagrammatic representation of a sound picture projector showing switching means associated with one of the loops in the film;

Figure 3 is a diagrammatic sketch showing the circuits of the motors shown in Figure 1; and Figure 4 is a diagrammatic sketch showing the use of a breaker motor for bringing the picture in synchronism with the sound.

In the embodiment herein shown and described which is given by way of example, a synchronous motor provided with dephasing means drives the feed, take-up and intermittent sprockets of the machine. A second synchronous motor drives the sound drum. Loops are maintained on each side of the sound drum, and switching means is associated with the loop between the sound drum and the take-up sprocket so that when this loop becomes shortened due to the slippage of the film passing over the drum or due to changes in the length of the loop because of other linear errors in the movement of the film over the drum, the switch is closed and momentarily dephases the motor associated with the sprockets, thereby slowing the picture for several picture frames while the drum is rotated at a constant speed. With the drum of a definite circumference, different thicknesses of film moving thereof will have various linear errors of movement which will cause one of the loops to become shortened and the other to become lengthened.

Referring to Figure 1, a motor 10 is provided with a reduction gear box 11 on one end thereof which includes a shaft 12 which is driven at the rate of 144 revolutions a minute, for example. A shaft 13 mounted co-axially with respect to the shaft 12, is provided with a flanged member 14 having a plurality of studs 15 extending from the face thereof. The flanged member 14 is fixed or keyed into the shaft 13 in any suitable manner. A hub member 16 is keyed or otherwise fixed on the shaft 12 and carries a plurality of spring members 17 and 18. The spring members 17 bear against the studs 15, and the spring members 18 are each formed to partially embrace a stud 19, one stud 19 being provided adjacent to each stud 15. This arrangement of the flanged member 14, the hub member 16 and the sprockets and studs constitutes a combined flexible drive and mechanical filter.

A flywheel 22 is carried by the shaft 13 and forms a working fit therewith. This flywheel is not keyed to the shaft; it has a depression 23 formed therein and a friction member 24 frictionally engaging the bottom surface 25 of the depression 23. The friction member 24 is spring pressed against the surface 25 by a plurality of spring arms 26 which are secured to a flange member 27. This flange member is provided with a hub 28 which is keyed or pinned to the shaft 13 in any suitable manner, for example by means of a taper pin 29.

The other end of the shaft 13 has secured thereto a drum 30 which is provided with flanges 31 and 32. It is also provided with smooth surface 33 between the two flanges.

A crank arm 34, suitably pivoted in the frame 35, carries a roller 36 adapted to engage and hold a film in contact with the surface 33 of the drum. A spring 37 associated with the arm 34 and the frame 35, imparts a predetermined pressure on the roller which is in turn transferred to the drum along the line of contact of the roller with the film.

The shaft 13 is supported on suitable journals 43 and 44. A second motor 41 is provided with a reduction gear box 38 on one end thereof which includes a shaft 45. A shaft 39 which is supported by suitable journals 40 and 42 is in line with the shaft 45 and connected thereto by a suitable flexible coupling member 46. The shaft 39 in the embodiment shown may for example rotate at a speed of 360 revolutions per minute.

A gear 50 is secured to the shaft 39 and meshes with a gear 59 carried on a shaft 58. The other end of the shaft 58 has associated therewith an intermittent movement positioned in a housing 60. This housing also contains the intermittent of a "Geneva" movement and has associated therewith a shaft 61 carrying an intermittent sprocket 62. A shaft 63 suitably journaled in the frame 35, has secured thereto a sprocket 64 which functions as a speed and takeup sprocket.

The shaft 58 and the shaft 63 are positively linked together in driving relation, a chain sprocket 65 being secured to the shaft 58 and a like chain sprocket 66 being secured to the shaft 63 and an endless chain 67 linking 65 and 66 together.

Referring to Figure 2, the film, designated by the numeral 68, passes from a reel (not shown) along the surface of the sprocket 64 and may be held into engagement with this sprocket by means of a roller 69 and may pass between free rollers 70 and 71. A loop 72 is formed in the film above the film gate 73. The film passes through the film gate to the intermittent film sprocket 62, a roller 72 being provided to retain the film in engagement with this sprocket.

Below the intermittent sprocket, a loop 75 is formed in the film after which it passes between free rollers 76 and 77 over the surface of a sound gate 78, over a roller 79 and on to the surface 33 of a drum 30.

The film is held into engagement with the drum by means of the roller 36 carried on the arm 34 above described, the spring 37 being of sufficient tension to hold the film frictionally against the surface 33 of the drum. This film is in contact with the surface 33 over the major portion of the surface of the drum, thereby holding slippage down to a minimum.

The film leaving the drum passes over the roller 36 and is formed into a loop 80 after which it passes between the free rollers 81 and 82 and is also engaged by some of the teeth in the sprocket 64. A roller 83 holds the film in contact with the lower surface of the sprocket 64.

The film, after leaving this sprocket, passes to a suitable takeup reel (not shown).

A bracket 84 supported on a suitable pivot pin 85 has secured thereto a mercury switch 86. The upper end of the bracket 84 carries a pivot shaft 87 which, in turn, has pivotally mounted thereon a roller 88.

The mercury switch 86 is provided with terminals 89 and 90 which are connected to the sprocket driving motor 10 and momentarily dephase said motor when the loop 80 is shortened due to the slippage of the film on the drum 30.

The sound gate 78 has an aperture 95 formed therein and has positioned on one side thereof a light sensitive cell 96 which is connected to a suitable amplifier 97. A loud speaker 98 and its field coil 99 are connected to the amplifier.

An optical scanning unit 100 is positioned above the sound gate 78, as shown in Figure 2. A source of illumination 101 is provided for both the sound and the pictures. Light passes from this source 101, via a suitable condensing lens 102, through the film gate 73 and via an objective lens 103 to a screen 104.

A reflector 105 is positioned on the opposite side of the source to that of the condensing lens to reflect light therethrough. The optical scanning unit 100 receives its light endwise from the source 101, the latter being inverted for this purpose.

When the device is operating, the film 68 is positively moved by the sprocket 64 and the intermittent sprocket 62 to project a picture on the screen 104. As the film leaves the intermittent sprocket 62 it is frictionally driven by means of the drum 30, the loops 75 and 80 removing it from the mechanical influence of the sprocket.

As the drum 30 is driven at a constant speed, the sound is reproduced at a uniform rate. Due to the fact that the film is frictionally driven by the drum 30 slight increments of slippage occur which eventually shorten the loop 80.

As the loop 80 is shortened, the roller 88 is engaged and the bracket 84 is tilted, thereby tilting the mercury switch 86 and causing the mercury to connect the contacts 89 and 90 together. This action completes a circuit which delivers direct current to a dephasing coil in the motor 10 thereby momentarily slowing the speed of the motor 10. As soon as this occurs, the length of the loop 80 is immediately increased and this increase of length will permit the bracket 84 and the mercury switch 86 to assume their normal positions.

In the embodiment shown and described, the drum is preferably of a diameter whose circumference is substantially equal to the length of ten picture frames. Therefore, since the drum is driven at the rate of 144 revolutions per minute, the speed of the film is equal to the length of 1440 picture frames.

Referring to Figure 3 which is a circuit diagram of the motors 10 and 41, a source of current 120 is provided and a switch 119 is provided for connecting the bus wires 117 and 118 to the source.

The field 110 of the motor 10 is bridged across the bus wires 117 and 118 and the starting winding and the centrifugal switch 112 are connected in series with each other and across said bus wires. The motor 10, as pointed out above, is a synchronous motor which drives the drum 33 at constant speed.

The motor 41 is provided with a main winding 113 which is also bridged across the bus wires 117 and 118, and the starting winding 114 and the cut-out switch 115 are in series with each other and connected in parallel with the winding 113. One side of the starting winding 114 is also connected to a resistor 116 and thence via a wire 92 to a source of current 93. The source 93 is connected to the terminal 90 of the mercury switch 86 and the terminal 89 of the mercury switch is connected via a wire 91 to a point between the starting winding 114 and the switch 115 so as to bridge the winding 114.

As described above, the motor 41 is a synchronous motor which drives the sprockets in the projector and since the length of the loop 80 controls the mercury switch 86, by tipping the switch when the loop 80 becomes shortened, the starting winding 114 of the motor 41 is energized with direct current from the source 93 when said switch 86 is tilted due to the shortening of the loop 80. This momentarily desynchronizes the motor 41 and the loop 80 immediately increases in length, tilting the mercury switch in the other direction and deenergizing the starting winding 114, whereupon the motor returns to synchronous speed.

It has been determined that the above action slows the sprocket drives sufficiently to increase the length of the loop 80 by approximately four picture frames and the action is so quick that it is imperceptible to the human eye.

A further embodiment of the invention contemplates the use of a breaker motor shown diagrammatically in Figure 4 and consisting of an armature 126, brushes 127 and 128 together with series field coils 129 and 130. Connected in series with the motor are breaker contacts 131 and 132 operated in the usual manner. These contacts are bridged by a suitable capacitor 133.

Bridging the contacts 131 and 132 in a tapped resistor 136. A plurality of contact members 137, 137a, 137b, etc. is provided. The taps on the resistor are connected to the contact members in the manner shown in the diagram. A contact bar 138 parallels the contact members 137, 137a, 137b, etc., and a sliding contact 139 is provided for spanning two of the contact members and a portion of the length of the contact bar 138. A tap 140 connects the resistor 136 to the bar 138 in such a manner that the resistance of the section 136a is the lowest resistance bridging the contacts 131 and 132 when the regulator is in its fastest position, as will presently be described. A pigtail 140a connects the tap 140 to the sliding contact 139.

The sliding contact 139 is pivotally connected to a rod 141 by means of a pivot pin 142 at one end thereof, and the other end of the rod 141 is pivotally connected by means of a pivot 143 to a lever 84a, which is in turn pivotally mounted on the frame by means of a pivot pin 85a. A roller 88a carried on the lever 84a is engaged by the loop 80a in the film so that when the loop becomes shortened, the lever 84a is moved upwardly in a counter-clockwise direction, thereby moving the sliding contact 139 upwardly as viewed in Figure 4 to bridge the contacts 131 and 132 with a higher resistance, thereby slowing the motor 125 and causing the loop 80a to assume its normal length, in which event the sliding contact 139 moves back down to its normal position as shown in Figure 4. If the loop 80a were to become too long, the sliding contact 139 would descend and cause less resistance to bridge the contacts 131, 132 and thereby speed up the motor so as to shorten the loop. Therefore by providing the proper adjustment on the spring 144 by means of the thumb screw 145, a perfect balance may be obtained and the loop 80a may be automatically maintained at a constant length.

A further embodiment contemplates the provision of an adjusting screw 146 which is adapted to engage the lever 84a and therefore may be said to limit the highest speed of the motor to a predetermined value in which event the sliding contact 139 could only be moved in a minus (—) direction to slow the machine sprockets and thereby increase the length of the loop 80a.

Although a simple embodiment of the invention has been herein shown and described, it is obvious that many changes can be made in the arrangement shown without departing from the spirit of the invention as defined in the following claims.

What is claimed is:

1. In a device for projecting pictures and reproducing sound, a combined sound and picture record, sprocket means for moving said film through said device to project said pictures, a motor comprising the sole means for driving said sprocket means, a scanning device including a sound gate for producing light modulations corresponding to said sound portion of the film, a non-positive driving member for moving said film through said sound gate, a second motor comprising the sole means for driving said non-positive driving member, means forming a loop in said film between said non-positive driving member and one of said means functioning as a take-up sprocket, means forming a loop in said film between said sound gate and another of said sprocket means, and switching means controlled by the length of said first loop and having connected in circuit therewith instrumentalities for momentarily slowing the speed of said first motor thereby slowing all of said sprocket means to bring the picture back into synchronism with the portion of the sound record being scanned.

2. In a device for projecting pictures and reproducing sound, a combined sound and picture record, a film gate, a source of illumination on one side of said film gate, an objective lens on the other side of said film gate, sprocket means for moving said film through said device including an intermittent movement associated with said film gate, a synchronous motor for driving said sprocket means, a smooth drum engaging and driving said film during a portion of its transit through the device, a second synchronous motor driving said drum, a scanning device including a sound gate positioned adjacent said drum and adapted to scan the sound portion of the record, means forming a loop in said film between said drum and said sprocket means, means forming a loop in said film between said sound gate and said film gate, switching means associated with said first loop, and circuits between said switching means and the starting winding of said first synchronous motor, said circuits including a source of current whereby when said loop becomes shortened the starting winding of said first motor is momentarily energized by current from said source thereby momentarily de-synchronizing the motor and slowing said sprocket means to retard the projection of pictures and compensate for the slippage of the film over said drum.

3. In a device of the character described, a picture projector including a take-up sprocket, and a sound reproducer for reproducing pictures and the accompanying sound from a combined sound and picture record, a synchronous motor for driving said picture projector, a second synchronous motor for driving a smooth drum in said sound reproducer, and switching means engaging the film between said sound reproducer and the take-up sprocket, said projector and including means for momentarily de-synchronizing and reducing the speed of said first motor in order to bring the pictures projected by said projector into synchronism with the sound reproduced thereby compensating for the slippage of the film driven by said second motor.

4. In a device for projecting pictures and reproducing sound, a combined sound and picture record, a film gate, a source of illumination on one side of said film gate, an objective lens on the other side of said gate, sprocket means for moving said film through said device including an intermittent movement associated with said film gate, a driving motor operatively connected to said sprocket means, a smooth drum driven independently of said sprocket means engaging and driving said film during a portion of its transit through the device, a second motor operatively connected to said drum, a scanning device including a sound gate positioned adjacent to said drum and adapted to scan the sound portion of said record, means forming a loop in said film between said drum and said sprocket means, means forming a loop in said film between said sound gate and said film gate, and switching means associated with said first loop and having connected thereto a circuit including instrumentalities for momentarily slowing said first motor each time said loop becomes shortened, thereby retarding the projection of pictures to compensate for the slippage of the film over said drum.

5. In a device for projecting pictures and reproducing sound, a combined sound and picture record, a film gate, a source of illumination on one side of said film gate, an objective lens on the opposite side of said gate, sprocket means for moving said film through said device including an intermittent movement associated with said film gate, a driving motor operatively connected to said sprocket means, a smooth drum engaging and driving said film during a portion of its transit through the device, a second motor operatively connected to and forming the sole means for driving said drum, a scanning device including a sound gate positioned adjacent to said drum and adapted to scan the sound portion of said record, means forming a loop in said film between said drum and said sprocket means, means forming a loop in said film between said sound gate and said film gate, and control means associated with said first loop for reducing the speed of said first motor to retard the projection of pictures to compensate for the slippage of film over said drum.

6. In a device for projecting pictures and reproducing sound, a combined sound and picture record, a film gate, a source of illumination on one side of said film gate, an objective lens on the other side of said gate, sprocket means for moving said film through said device including an intermittent movement associated with said film gate, a synchronous driving motor operatively connected to said sprocket means, a smooth drum engaging and driving said film during a portion of its transit through the device, a second synchronous motor operatively connected to and comprising the sole means for driving said drum, a scanning device including a sound gate positioned adjacent to said drum and adapted to scan the sound portion of said record, means forming a loop in said film between said drum and said sprocket means, means forming a loop in said film between said sound gate and said film gate, and speed control means associated with said first loop for de-synchronizing said first motor and causing it to slow down when said first loop becomes shortened, thereby retarding the projecting of pictures to permit said loop to become longer thereby compensating for the slippage of the film over said drum.

WILLIAM J. MORRISSEY.